United States Patent
Backmann et al.

(10) Patent No.: US 11,660,799 B2
(45) Date of Patent: May 30, 2023

(54) METHOD FOR CONTROLLING FILM PRODUCTION

(71) Applicant: Windmöller & Hölscher KG, Lengerich (DE)

(72) Inventors: Martin Backmann, Lengerich (DE); Markus Bussmann, Essen (DE)

(73) Assignee: Windmöller & Hölscher KG, Lengerich (DE)

(*) Notice: Subject to any disclaimer, the term of this patent is extended or adjusted under 35 U.S.C. 154(b) by 532 days.

(21) Appl. No.: 16/608,840

(22) PCT Filed: Apr. 20, 2018

(86) PCT No.: PCT/EP2018/060189
§ 371 (c)(1),
(2) Date: Oct. 27, 2019

(87) PCT Pub. No.: WO2018/197358
PCT Pub. Date: Nov. 1, 2018

(65) Prior Publication Data
US 2020/0189167 A1    Jun. 18, 2020

(30) Foreign Application Priority Data
Apr. 26, 2017 (DE) ...................... 10 2017 108 924.1

(51) Int. Cl.
*B29C 48/92* (2019.01)
*G05B 19/418* (2006.01)

(52) U.S. Cl.
CPC ........ *B29C 48/92* (2019.02); *G05B 19/41875* (2013.01); *G05B 2219/32018* (2013.01);
(Continued)

(58) Field of Classification Search
None
See application file for complete search history.

(56) References Cited

U.S. PATENT DOCUMENTS

| | | | | |
|---|---|---|---|---|
| 2005/0242169 A1* | 11/2005 | Michal | ................. | G05B 19/128 235/375 |
| 2016/0009014 A1 | 1/2016 | Schmitz | | |
| 2021/0379783 A1* | 12/2021 | Floeder | ................ | G05B 19/406 |

FOREIGN PATENT DOCUMENTS

| | | |
|---|---|---|
| DE | 10300375 | 7/2004 |
| EP | 2392446 | 12/2011 |
| WO | WO 2018/197358 | 11/2018 |

OTHER PUBLICATIONS

Mitteilung Gem?? Artikel 94(3) EP? Communication Pursuant to Article 94(3) EPC] dated Oct. 4, 2021 From the European Patent Office Re. Application No. 18719537.5 and Its Summary in English. (10 Pages).

(Continued)

*Primary Examiner* — Sean Shechtman (57) ABSTRACT

The invention relates to a method (100) for controlling film production, in which at least one film is produced according to at least one formula information (R), the following steps being carried out: initiation of execution (210) of a film production process such that a film is produced on the basis of a specific formulation information (R); determination of monitoring information (I) during the execution (210) of the process; determination of at least one fingerprint (F) on the basis of the specific formula information (R) and on the basis of the monitoring information (I) such that the execution (210) of the process is characterised on the basis of the fingerprint (F); and comparison of the fingerprint (F) with a control matrix (M) such that at least one comparative result is determined in order to control the film production on the basis of the control matrix (M) as an evaluation basis.

14 Claims, 5 Drawing Sheets

(52) U.S. Cl.
CPC .............. *G05B 2219/32184* (2013.01); *G05B 2219/32189* (2013.01); *G05B 2219/34457* (2013.01)

(56) References Cited

OTHER PUBLICATIONS

Internationaler Recherchenbericht und Schriftlicher Bescheid [International Search Report and the Written Opinion] dated Jul. 20, 2018 From the International Searching Authority Re. Application No. PCT/EP2018/060189 and Its Translation of Search Report Into English. (20 Pages).
Du et al. "Control Strategy", Modeling and Control of Vibration in Mechanical Systems, XP002782809, Chap.4.4.3: 86, Apr. 16, 2010.
Lavretsky "Consider an LTI System", Advanced Topics in Systems and Control: Adaptive Control, XP002782810, Lecture 3, Ex. 6.3: 23-31, Apr. 16, 2010.

\* cited by examiner

METHOD FOR CONTROLLING FILM PRODUCTION

RELATED APPLICATIONS

This application is a National Phase of PCT Patent Application No. PCT/EP2018/060189 having International filing date of Apr. 20, 2018, which claims the benefit of priority of German Patent Application No. 10 2017 108 924.1 filed on Apr. 26, 2017. The contents of the above applications are all incorporated by reference as if fully set forth herein in their entirety.

FIELD AND BACKGROUND OF THE INVENTION

The present invention relates to a method for controlling a film production in which at least one film is produced depending on at least one recipe information. Furthermore, the invention refers to a control system and a computer program product.

SUMMARY OF THE INVENTION

It is known from the state of the art that films are manufactured depending on production information, the so-called recipe. This recipe is used to at least partially automatically parameterize the film production by defining various individual parameters, such as a material mixture or various method parameters for the film production machine. The film is produced, for example, by blowing, and the film production machine is, for example, an extrusion machine or the like.

It is also known that such film production machines monitor production parameters, i.e. the production is checked on the basis of the monitoring information determined. For example, temperature monitoring or film thickness monitoring is provided. In particular, an operator of the film production machine manually influences the production on the basis of the monitoring information.

A disadvantage of the well-known solutions for controlling film production is that monitoring and quality assurance during production often turns out to be complex. In particular, the technical implementation of monitoring and quality assurance is difficult and costly. For example, it is common for the film to be inspected only after film production or after further processing, e.g. by laboratory tests, in order to check the quality of the film. If the film does not meet the quality requirements, the film must be replaced. This leads to additional time and costs in film production and use.

It is therefore an object of the present invention to at least partially eliminate the disadvantages described above. In particular it is an object of the present invention to enable an improved film production in which a sufficient film quality can be guaranteed. In particular, film production should be simplified and implemented more cost-effectively.

The preceding object is solved by a method with the features of claim 1, by a control system with the features of claim 17 and by a computer program product with the features of claim 20.

Further features and details of the invention result from the respective dependent claims, the description and the drawings. Features and details which are described in connection with the method according to the invention also apply, of course, in connection with the control system according to the invention as well as the computer program product according to the invention, and vice versa in each case, so that with regard to the disclosure on the individual aspects of the invention, mutual reference is or can always be made.

The object is solved in particular by a method for controlling film production, in particular blown film production, in which at least one film, in particular plastic film, preferably blown film, preferably stretch film, preferably as continuous product, is produced as a function of at least one recipe information (recipe).

Preferably, film production, i.e. in particular at least one method execution of film production, is performed in such a way that manual or at least partially automatic parameterization of film production takes place on the basis of the recipe information, in particular by defining various individual parameters, such as e.g. a material mixture or various method parameters for a film production machine, such as an extruder.

In particular, it is provided here that at least one of the following steps is performed, preferably the steps being performed one after the other or in any order, preferably individual steps also being able to be performed repeatedly:

initiating (at least) one method execution for film production so that (at least) one film is produced on the basis of (respective) specific recipe information, Determination of monitoring information for the (respective) method execution, Determination of at least one (respective) fingerprint on the basis of the (respective) specific recipe information and/or on the basis of the (respective determined) monitoring information, so that the (respective) method execution is characterized on the basis of the fingerprint, Comparison of the (respective) fingerprint with a control matrix, so that at least one comparison result for controlling film production is determined on the basis of the control matrix as the basis for evaluation.

This has the advantage that the method execution, in particular the quality of the film produced, can be controlled easily and quickly. Preferably, quality control (i.e. in particular the comparison of the fingerprint with the control matrix) can already be performed during the method execution on the basis of the control matrix.

Preferably, it is possible that the steps according to the invention are also performed (at least partially) for further method executions, so that fingerprints are also determined for further method executions and/or the comparison of the respective fingerprints with the control matrix is performed. For example, the control matrix can be continuously adapted so that improved or optimized control is sought for further method executions.

For example, more than 10 or more than 100 or more than 1000 or more than 10000 method executions can be performed in order to produce, for example, one film as a continuous product or several films according to the film production. It may be possible that the control matrix is used to forecast the film quality by comparing the results. If necessary, the control matrix can be continuously adapted (in the course of the method execution) in such a way that the comparison with the control matrix for the 1000th method execution enables a better prognosis than is the case for the 10th method execution. In other words, the control matrix can be optimized in the course of film production.

Furthermore, it may be provided in the method according to the invention that the control of a method execution (only) takes place on the basis of the fingerprint (in comparison with the control matrix), preferably without having to evaluate or determine result information of this method execution, such as a product property of the film produced thereby. Thus, for example, an active or fully executed method execution can be evaluated quickly and/or immediately in order to determine or forecast the quality of the film is sufficient. This enables an evaluation of the film quality on the basis of the fingerprint even before complex laboratory tests or the like are performed. Optionally, the result information can still be determined on the basis of the film produced, e.g. on the basis of laboratory data and/or data from subsequent machines (further processing data). However, this can then serve in particular to improve the subsequent control of subsequent method executions, in particular by optimizing the control matrix.

In particular, "control" in the context of the invention means that monitoring and/or checking and/or evaluation and/or adaptation and/or control and/or regulation of the film production, in particular of at least one method execution, preferably of a film production machine used thereby and/or of individual parameters, takes place. This can also include, for example, a control, i.e. in particular a monitoring and/or evaluation, of a result of the method execution, i.e. the film produced. The method execution, i.e. in particular the individual parameters for operating at least one film production machine, such as an extruder, can also be controlled, i.e. regulated and/or controlled. Preferably in this case the control includes the adjustment on the basis of a (measured) actual value of the individual parameters in comparison with a respective nominal value for the individual parameters. In particular, the framework conditions for the actual and target values can be specified by the control matrix, e.g. by a tolerance range of the control matrix, such as upper and lower limits for the values. The control, in particular the control and/or regulation and/or evaluation, may also relate to the consideration of this tolerance range. For example, the tolerance range is compared with the actual and/or target values which are used in the method execution. This has the advantage that the quality of the method execution and/or the film produced can be evaluated and/or guaranteed by comparing a fingerprint with the control matrix. The control matrix therefore represents an evaluation basis which defines the framework conditions for achieving the desired quality of the film.

In other words, the control matrix may contain at least one piece of information which is used for control, in particular for evaluation, film production or method execution. Such information is, for example, at least one tolerance range, i.e. an upper and lower limit for values of the monitoring information and/or the prescription information of a fingerprint. For example, the quality of the film is significantly influenced by the recipe information, which in particular includes specifications, e.g. target values, for individual parameters (as a so-called recipe for film production). In particular, the specifications may include at least one set value for the individual parameters in order to perform a corresponding control of the method execution (e.g. by means of a control system for the film production machine, such as a temperature control system). The monitoring information, on the other hand, can include, for example, measured actual values of the individual parameters of the method execution. Preferably, the control matrix can include additional specifications or control criteria, such as a tolerance range in which the actual and/or target values of the individual parameters should be in during the method execution. Compliance with this tolerance range can be determined, for example, by comparing the control matrix with the fingerprint. In particular, if the tolerance range is not observed, this can result in a corresponding check, i.e. a negative evaluation of the quality, for example, or an active counter measurement or control of the method execution, or also an adaptation of the recipe information to guarantee the quality. The comparison and/or control is made possible, for example, by the monitoring information which, for example, is the result of monitoring the individual parameters during a method execution.

Optionally, the tolerance range can be compared directly with the monitoring information, whereby the monitoring information, e.g. through the fingerprint, is provided in particular as digital data. This enables simple and immediate monitoring, evaluation and/or assurance of the quality of method execution.

In particular, the use of a control matrix as a basis for evaluation allows a simple definition of evaluation criteria, which are provided by the information of the control matrix (such as a tolerance range). Preferably, the evaluation criteria can be optimized by determining and/or adapting the control matrix, e.g. by evaluating fingerprints during one or more film productions, in order to achieve the desired quality. At the same time the advantage can be achieved that by the determination of fingerprints and/or by the comparison of the fingerprints with the control matrix a simple and flexible quality control is made possible, which can be performed e.g. also computer-supported and/or networked and/or automated.

For example, at least one control matrix is determined and/or adapted by performing an evaluation of fingerprints and/or result information from preceding method executions, so that an evaluation result is preferably determined. In particular, the control matrix can then be determined on the basis of the evaluation result. The evaluation may, for example, include an analysis of different fingerprints and/or result information, in particular a statistical analysis. For this purpose, for example, the fingerprints are assigned to associated result information which is specific to the respective fingerprints (i.e., the respective result information was determined using a film which was produced by the method execution which characterizes the fingerprint). In particular, the evaluation may include the determination of a correlation between different fingerprints and/or different result information (autocorrelation). For example, the evaluation also includes the use of complex (statistical) analyses, such as linear prediction and/or trend analysis and/or pattern recognition and/or neural networks and/or artificial intelligence and/or the like.

Preferably, the fingerprint can also be stored digitally, optionally with further information (such as an associated control matrix and/or an identifier for method execution, such as a time stamp or the like), preferably in an electronic data system (such as a database system). In particular, the fingerprint also includes the recipe information, so that the individual parameters of the recipe information used in the associated method execution can also be accessed at a later point in time. For example, if the comparison of the fingerprint with the control matrix reveals a particularly good approximation to a quality result, the recipe information of the fingerprint can be marked accordingly and/or used for subsequent method executions. Also, an analysis of one or more fingerprints, particularly as a function of a respective comparison result (the comparison with the control matrix), may be used to determine a correlation between the recipe information and the result obtained (e.g. result information on the quality of the film produced in the method execution associated with the fingerprint). This allows conclusions to be drawn about particularly promising prescription information for a particular result.

It is preferred that a multitude of fingerprints for a multitude of different method executions are stored in a data system and preferably evaluated on the basis of the respective result information. In particular, a correlation and/or trend between fingerprints and/or in relation to result information and/or other data shall be established. For example, the result information and/or other data can result from different data sources. For example, data can be determined during the further processing of the film (further processing data) and/or the use of the produced film. Further processing includes, for example, processing by a winder, especially if the film is configured as a stretch film. The data can, for example, be determined automatically and/or entered manually. On the basis of the evaluation, the (active) method execution can then be checked directly (in particular by comparing the fingerprint of the method execution with the control matrix) and/or subsequent method executions can be checked on the basis of the evaluation.

In particular, it is possible that the method execution includes an entire production or a production step or a sub-process of a production of a film. In particular, a film production machine, e.g. as part of an extrusion line for the production of a blown film, is controlled, i.e. controlled and/or regulated, on the basis of the recipe information. It is possible that a change in the recipe information immediately causes a change in the film produced, as this changes, for example, a material mixture. Accordingly, the fingerprint can be used to uniquely characterize the method execution and thus be clearly distinguished from other method executions on the basis of the respective fingerprints.

It may be possible that several fingerprints are determined for several different method executions. For example, the comparison with the control matrix can be made for each of the fingerprints in order to continuously monitor the film production, e.g. to monitor and/or adjust the quality of the films produced. The control matrix can also be adjusted in each of these comparisons if necessary, in particular to optimize the quality of film production. This adaptation takes place, for example, by evaluating a result of the respective method executions (in particular by means of result information, such as a product property of the film produced, preferably automated). For example, depending on a deviation of this result information, the control matrix can then be adapted (automatically) to a given desired result in order to achieve a changed result in a subsequent method execution. This adaptation can be done in such a way that the control matrix is optimized to achieve the desired result. This can be done, for example, by iterative evaluation of the result information and adjustment depending on this evaluation. It is also possible that the evaluation may also include an evaluation of the recipe information and/or the adaptation may also include an adaptation of the recipe information. Depending on the result, the recipe information can thus be optimized in such a way that the desired result is achieved in a method execution on the basis of the recipe information.

In particular, the respective recipe information can be identical or different for the different method executions. With different recipe information, overlapping recipe control of method executions are conceivable. Otherwise, only a prescription-internal check is performed. For example, a cross-prescription or internal prescription evaluation (of a correlation or a trend) of the fingerprints can be provided.

Furthermore, it may be possible in the case of an invention-based method that, in order to determine the monitoring information, a recording (in particular measurement) of individual parameters, in particular of properties of the material mixture and/or of method parameters and/or method variables during method execution, is performed. Preferably, the comparison of this monitoring information with the control matrix enables the quality of the method execution to be guaranteed.

The quality of the method execution means, for example, that at least one result information of the method execution is evaluated, e.g. a product characteristic of the film produced in the method. For a given quality, this result information must meet certain criteria, e.g. a given tensile strength of the film or the like must be achieved. In other words, quality refers preferably to (product) properties of the film. These product properties can be determined, for example, to determine the result information directly during method execution (inline) or also outside method execution (offline). For example, the result information may include at least one quantitative information (for example, a measured property as a product property, such as a degree of tensile strength, a stress elongation curve, a thickness or geometry of the film, a basis weight or the like) or at least one qualitative information (for example, a user feedback as to whether damage has occurred to the film). Furthermore, the result information can also have an assignment to a position (i.e. position information). This enables, for example, a running meter-dependent assignment of the product properties to the film positions during film production. In particular, the position information also allows conclusions to be drawn about the fingerprint or the values of the fingerprint that were determined at a certain position during the production of the film. These fingerprint values are, for example, monitoring information.

On the basis of the result information, it can also be concluded to what extent the monitoring information may deviate from a certain tolerance range in order to achieve the desired result.

In other words, the tolerance range of the control matrix can also be adjusted according to a further execution form on the basis of the result information, so that the control matrix is optimized.

The monitoring information preferably comprises at least one piece of information about the individual parameters and is determined, for example, by determining (in particular measuring) properties of the material mixture and/or method parameters and/or method variables during method execution. For example, the fingerprint can include both the monitoring information determined for a specific method execution and the recipe information used for this method execution. This enables the characterization of the associated method execution very comprehensively based on the fingerprint. Thus, the fingerprint can be used to subsequently evaluate and/or analyze the method execution and/or, if the result is good, the associated method execution can be repeated in a similar manner in order to reproduce the result obtained (i.e. in particular the product properties of the film produced). An analysis of different fingerprints can be performed, for example, by comparing the fingerprints with the result information obtained during the respective method execution and/or with each other. For example, an optimal fingerprint can be determined in order to achieve a certain result.

However, it is often not possible to perform a subsequent method execution in such a way that the earlier method execution on which this optimal fingerprint is based is completely reproduced. Deviations in the individual parameters may therefore occur, which can, for example, be recorded by the monitoring information. The comparison of this monitoring information with the control matrix enables the assurance that these deviations do not exceed a specified limit. The control matrix can also be determined and optimized based on the analysis, in particular by correlating a large number of already determined fingerprints and/or associated result information in order to perform subsequent method executions in such a way that a certain result is reproduced in sufficient approximation. For analysis purposes, fingerprints can be permanently (non-volatilely) stored in a data system and made available. In particular, the result information can also include error information in order to determine the cause of the error by means of the analysis. The correlation can, for example, include an autocorrelation (of the fingerprints), so that a cause for an error in method execution can be reliably identified. The result information can also include, for example, film production-specific information about blocking and/or edge break and/or a type level and/or a slope.

According to a further advantage, the recipe information comprises at least one information about at least one individual parameter for parameterizing film production, in particular method execution, preferably at least one film production machine. The individual parameter is, for example, a material mixture and/or a method parameter and/or a method variable by which the method execution can be influenced. For this purpose, for example, a film production machine, such as an extruder, can be set on the basis of the values specified by the recipe information for at least some of the individual parameters. Also, at least some of the individual parameters, such as the material mixture, influence the composition of the film to be produced. The material mixture comprises, for example, at least one parameter of a raw material of the film (e.g. per layer of the film) or of a material of the film. The material mixture can also include at least one parameter of the layers of the film, such as a layer thickness and/or a layer sequence and/or a number of layers. The material mixture can also affect a mixing ratio per layer. On the other hand, the method parameter can include a controllable variable, such as a film speed and/or a frost line of the film and/or a pressure and/or a temperature during film production, such as a melt temperature and/or cooling air temperature and/or melt temperature, and/or a pressure during film production. In particular, a "simple dependency" exists for the method parameter, i.e. the method parameter provides a set value in order to adjust a determined actual value to the set value in accordance with a control during method execution. On the other hand, the individual parameter "method variable" can include parameters that have a "complex dependency". This means that it may not be possible to simply control the method variables in the sense of the method parameters. For example, the method variables are significantly determined by a number of influencing factors that require more complex control and/or manual intervention during method execution.

Advantageously, the invention may provide that the control matrix comprises at least one comparison criterion for values of the fingerprint, in particular for values of the monitoring information, wherein in particular the comparison of the fingerprint is performed on the basis of the comparison criterion, so that the method execution is controlled, preferably evaluated and/or adapted and/or visualized and/or controlled and/or regulated on the basis of the comparison result as a function of the comparison criterion. Furthermore, it may also be provided that the method execution and/or a subsequent method execution is adapted on the basis of the comparison result in order to improve the film quality. For example, the comparison is made by determining a relation (relationship information) between the values of the fingerprint and the comparison criterion.

Thus, the control matrix can provide a comparison criterion to evaluate the quality of a method execution simply and reliably. Thus, the quality of the produced film can also be determined automatically and/or by data processing, without the need for time-consuming examinations of the film.

It may be possible for the monitoring information to be compared directly with the control matrix during method execution and/or indirectly by being compared by storing it in the fingerprint, whereby the fingerprint is then compared directly with the control matrix. It may also be possible to visualize the information of the monitoring information and/or the control matrix and/or the comparison result for an operator or user of the film production machine and/or the film, e.g. by color coding. The monitoring information can also be visualized in trend form and/or by displaying a quality indicator (also in trend form if necessary), especially during active method execution.

It is also advantageous if the control matrix comprises a tolerance range as comparison criterion, and the comparison result is determined directly or indirectly by determining relationship information, preferably distance information and/or variation information and/or information about an overshoot and/or undershoot of at least one value from the fingerprint to at least one limit, in particular upper and/or lower limit, of the tolerance range. This enables the consideration of "quality limits" in order to produce the film with a desired quality within a specified tolerance range. For example, different tolerance ranges for different individual parameters (of the recipe information) can also be provided.

The invention may provide that the subsequent step, in particular after comparing the fingerprint, is to be performed:
  determining a quality index, preferably a single one, on the basis of the result of the comparison to identify a quality of the method performance and/or the film produced.

This quality indicator can be used, for example, for (permanent) of the produced film or can be visualized during the method (i.e. the method execution) for an operator of a film production machine. This enables simple and reliable control of film production.

In another possibility, it may be provided that the next step is performed, preferably after comparing the fingerprint:
  evaluating a quality of the method execution and/or produced film based on at least one comparison result, so that an evaluation result is determined, preferably the control matrix (M) comprising different comparison criteria for different individual parameters of the recipe information (R), for each of which at least one determines at least one comparison result, and preferably the comparison results are prioritized in order to evaluate the quality.

Particularly preferred is the quality correlated with a correspondence between at least one determined (actual) product property of the produced film and a given product property, whereby the control matrix is specific for the given product property. For example, the given product property is a specification for the requirements that the film (i.e. the product properties of the film) must meet. In particular, the greater the agreement, the higher the quality. This enables a simple and fast control of the film production.

It is also optionally possible for at least one of the following steps to be performed after quality assessment:
  automatic evaluation and/or adjustment of the recipe information on the basis of the evaluation result, automatic adaptation of at least one tolerance range of the control matrix on the basis of the evaluation result, in particular for optimization of the control matrix, so that a predetermined quality is preferably achieved when the tolerance range is maintained by the monitoring information, storing the evaluation result, in particular as a quality characteristic number and/or as a quality prediction and/or as a degree of a quality deviation, preferably as a function of at least one individual parameter of the method execution (in particular a roll identifier) and/or as a function of the running dependent-meter with respect to the produced film, the evaluation result preferably being stored in standardized form (for example between 0 and 1).

In particular, relevant individual parameters can be evaluated based on the evaluation result and/or the position of the film during production can be determined for which the quality meets the requirements. This also enables optimal evaluation to improve the control matrix and/or recipe information. In particular, a correlation of this information with result information can also be determined, so that laboratory data, data from downstream machines (further processing data) or the like can also be taken into account for the evaluation.

For example, the control matrix is automatically adapted on the basis of the evaluation result, and if necessary also based on further comparison results and/or further evaluation results of further method executions and/or at least one product property of the film produced in each case, determined on the basis of these comparison results. The running meter-dependent storage enables a simple and unambiguous assignment of the evaluation results to the relevant meter dependent-range of the film in order to store the position for an evaluated quality. The evaluation result can therefore also be used to prove the quality of the film. It is also conceivable that the evaluation result may be used as a decision-making aid as to whether intervention in the execution of the method is necessary in order to guarantee a certain quality.

It may be advantageous if at least one of the following steps is performed within the invention, preferably after comparing the fingerprint:
  initiating an alarm and/or a warning when the at least one comparison result fulfils an alarm and/or warning condition, preferably when a relationship information indicates a crossing of a border,
  performing a plausibility check from the at least one comparison result, wherein a warning is initiated if the plausibility check is negative.

For example, the alarm and/or warning condition and/or plausibility criteria can be predefined for the plausibility check, with the alarm and/or warning condition and/or plausibility criteria being determined empirically, for example. This enables film production to be performed simply and safely. In particular, a defect in the film production machine, such as a defective sensor or the like, can be reported by the warning notice.

It may also be possible that at least one of the following steps, preferably after comparing the fingerprint, is performed, preferably one step at a time, or that individual steps may be performed repeatedly:
  determining a quality prediction on the basis of the at least one comparison result, the comparison results preferably being evaluated prioritized for this purpose,
  determining a label for the produced film on the basis of the quality prediction and/or an evaluation result,
  determination of a degree of a quality deviation on the basis of the at least one comparison result, the comparison results preferably being evaluated prioritized for this purpose.

This allows an improved control of the quality of the film. Preferably, initiating the alarm/warning and/or performing the plausibility check and/or determining the quality prediction and/or determining the labelling and/or determining the degree of quality deviation may also be performed indirectly from the comparison result, e.g. from the assessment result.

In particular, several comparison results can also be provided, e.g. for different individual parameters. The comparison results can, for example, be evaluated prioritized by the fact that the comparison results are weighted differently, and can therefore be used with different weighting in the quality prediction and/or evaluation.

Preferably, it may be provided that the following step is performed, in particular after comparing the fingerprint:
  performing an active control, in particular a control and/or regulation, the method execution is performed as a function of the at least one comparison result, preferably by a control (in particular control and/or regulation) of a film production machine, wherein preferably the control being performed at least partially automatically.

This has the advantage that an automatic optimization of the quality can enabled. The comparison results can also be prioritized for control purposes, e.g. on the basis of a given weighting of the comparison results. The weighting can be determined, for example, by the recipe information and/or by the control matrix.

The invention may preferably provide for at least one measurement to be performed during the method execution in order to determine the monitoring information, the measurement preferably being performed for at least one method parameter and/or at least one method variable during the method execution. For example, the monitoring information can also include a running meter position of the produced film, so that the determined monitoring information can be assigned to a film position. This can be used, for example, to determine a certain position range of the film for which a certain quality was determined by comparing the fingerprint with the control matrix.

In particular, it is provided that the monitoring information comprises at least one value sequence which is specific for at least one measurement result in the method execution, the measurement result preferably being determined by a measurement at at least one film production machine, in particular at a specific position of the film. Preferably the position information indicates this position of the film.

It may also be possible that several (spatially separated) film production machines are used in the method execution, so that the method can also comprise several (temporally consecutive and/or spatially separated) sub-methods.

In another possibility it may be provided that the recipe information for different individual parameters of the method execution in each case comprises at least one piece of information, in particular at least one of the following pieces of information:
  at least one information for the material mixing during the method execution, in particular about layers of the film and/or about a raw material for at least one of the layers and/or about a thickness of at least one of the layers and/or about at least one layer sequence and/or number and/or about a mixing ratio of at least one of the layers,
  at least one information for at least one method parameter of the method execution, preferably about a film speed and/or about a temperature and/or about a pressure in the method execution, in particular in a film production machine, at least one information for a method variable of the method execution.

This enables a comprehensive evaluation of the prescription information and/or the monitoring information. Furthermore, it may be possible that the method variable depends on the method parameter and/or on physical and/or external influences by and/or on a film production machine, in particular according to a complex dependency.

In addition, it is optionally possible within the scope of the invention that the following steps (in particular successively) are performed during and/or after the comparison of the fingerprint:

determining in each case a comparison result for a plurality of the individual parameters, in particular by comparing the values of the monitoring information specific to the respective individual parameters with at least one respective comparison criterion of the control matrix, determining an individual quality value for each of the comparison results so that the individual quality score is specific to a particular individual parameter, determining a single quality value from the individual quality scores to identify a quality of method performance and/or the film produced, preferably prioritizing the individual quality values to determine.

For example, the monitoring information may include values measured as specific values for the individual parameters, such as a temperature or film speed measured on the film production machine or the like. These values can then be compared, for example, with the corresponding comparison criterion of the control matrix, e.g. with a specific tolerance range. For example, if the values lie within the tolerance range, a positive individual quality score can be determined. Otherwise, a negative individual quality score can be determined (whereby several quality levels are also possible for the individual quality score). This method can be repeated for different individual parameters. The only quality score can then be determined as the higher-level quality score from the individual quality scores in order to easily evaluate method execution.

It can be advantageous if the control matrix is determined in the context of the invention before initiating the method execution, taking into account a large number of previous method executions and/or comparison results. The consideration can be done, for example, by a statistical analysis, such as a trend analysis, the fingerprints and/or related result information. This enables a significant increase in the quality of film production. Alternatively or additionally, it may be possible to store fingerprints and/or associated result information based on previous method executions, in particular in a data system. For example, certain previous result information can be reproduced, especially by (automatically) parameterizing a film production machine, like an extruder, according to the fingerprint.

In another possibility, it may be provided that the control matrix is adapted, in particular automatically, to the film produced by the method execution on the basis of the comparison result and/or at least one product property, so that the control matrix is optimized for a predetermined product property. This enables a quick and easy improvement of the quality of the film production. In particular, a processing device may be used for this purpose, which shall automatically adapt the data collected (such as fingerprints and/or result information) accordingly.

It is also advantageous if the following steps for determining the control matrix are performed within the scope of the invention, in particular before initiating the method execution as a subsequent method execution, preferably one after the other:

determining a correlation result by evaluating a correlation for previous method executions with respect to the product properties of the films produced thereby, preferably on the basis of at least one particular fingerprint for each of the previous method executions, determining and/or adjusting a tolerance range of the control matrix on the basis of the correlation result in order to preferably adjust the subsequent method execution and/or further subsequent method executions on the basis of the control matrix taking into account the correlation.

In particular, one or more method executions may be provided to perform the correlation and further improve the quality.

Furthermore, the invention may provide that during the execution of the method and/or each subsequent execution of the method the following steps are to be performed, preferably one after the other:

determining a correlation for the method execution and/or for the further method executions between at least one product property of the at least one film produced thereby and the fingerprint determined thereby in each case, so that a correlation result is determined, adjusting the control matrix based on the correlation result so that the control matrix is specific for at least one predetermined product property.

Preferably, the adjustment of the control matrix can be self-learning, i.e. result information from subsequent method executions can be automatically taken into account in order to adjust the control matrix, e.g. by a film production machine itself. For example, the film production machine can adapt at least one tolerance range (i.e. the corresponding limits) of the control matrix itself, in particular as a function of an evaluation of several fingerprints of previous method executions and/or as a function of the result information. In particular, a running metre-dependent optimization can also be performed if the result information, for example, also includes position information. For example, certain values of the fingerprint and/or the monitoring information can be evaluated as particularly promising if a particularly good quality of the film is determined for these values (at this position) on the basis of the result information. This method can be repeated for further method executions. With each new production, this production limit can be defined more precisely/sharper.

The result information, which for example comprises at least one piece of information about at least one product property of the film, can be recorded for example by laboratory measurements or entered by a user of the film. In particular, by including result information, such as further processing data and/or laboratory data, in the evaluation and/or comparison, a statement can be made about the currently produced film quality of the active method execution. Also, an exact assignment of individual film rolls to the monitoring information and/or the recipe information (e.g. by means of coding) can be used to draw retrospective conclusions about the causes of possible deviations with exact accuracy to the running meter.

In addition, it may be provided that the correlation is evaluated across recipes for different method executions, through which a film is produced on the basis of different recipe information. Thus, for example, a correlation of different recipes can be evaluated in order, for example, to determine correlations for certain individual parameters across recipes. Alternatively, it can be provided that the correlation is only evaluated for method executions that use identical recipe information (recipe-internal).

Another object of the invention is a control system for controlling film production, in which a film can be produced on the basis of specific recipe information. The control system shall include in particular:
- at least one monitoring device, in particular a monitoring system, for determining monitoring information in at least one method execution for film production,
- at least one processing device for determining at least one fingerprint on the basis of specific recipe information for the (respective) method execution and on the basis of the determined monitoring information, so that the (respective) method execution can be characterized on the basis of the fingerprint.

In particular, it is provided here that the processing device is configured to compare the fingerprint with a control matrix, so that at least one comparison result for controlling film production can be determined on the basis of the control matrix as a basis for evaluation. Thus, the inventive control system has the same advantages as those described in detail with reference to an inventive method. In addition, the control system may be capable of being operated in accordance with a method in accordance with the invention. For example, the monitoring device and/or the processing device may each be configured as one or more computers or as a common computer and/or electronics and/or the like. For example, the computer or the electronics can be integrated in a film production machine.

It may optionally be possible to provide an evaluation device, in particular as at least one computer, which is electrically and/or radio and/or networked in data communication with the processing device in order to provide the control matrix for the processing device and/or to adapt the control matrix on the basis of the comparison result. For example, the evaluation device may comprise a data system, in particular a database system, in order to provide and/or evaluate different fingerprints from different method executions, so that in particular the control matrix is determined.

Another object of the invention is a computer program product for controlling film production, in which at least one film is produced as a function of at least one specific recipe information. In this case it is provided that the computer program product is configured to be processed by a processing device so that at least one of the following steps is performed, in particular successively:
- determining monitoring information during method execution,
- determining at least one fingerprint from said specific recipe information and from said monitoring information so that said fingerprint is used to characterize method execution,
- comparing the fingerprint with a control matrix is performed so that at least one comparison result for controlling the film production is determined on the basis of the control matrix as the basis for evaluation.

Thus, the computer program product according to the invention has the same advantages as described in detail with regard to a method according to the invention and a control system according to the invention. In addition, the computer program product may be configured to be processed by the processing device (in particular a control system conforming to the invention) so that a method according to the invention is preferably performed. The computer program product may, for example, be configured as a data carrier and/or as a computer-readable storage medium and/or as a firmware and/or the like, which comprises a computer program for performing the steps.

Further advantages, features and details of the invention result from the following description, in which embodiments of the invention are described in detail with reference to the drawings. The features mentioned in the claims and in the description may be essential to the invention either individually or in any combination. They show schematically:

DESCRIPTION OF SPECIFIC EMBODIMENTS OF THE INVENTION

In the following figures, the identical reference signs are used for the same technical characteristics, even for different embodiments.

Figure 1:
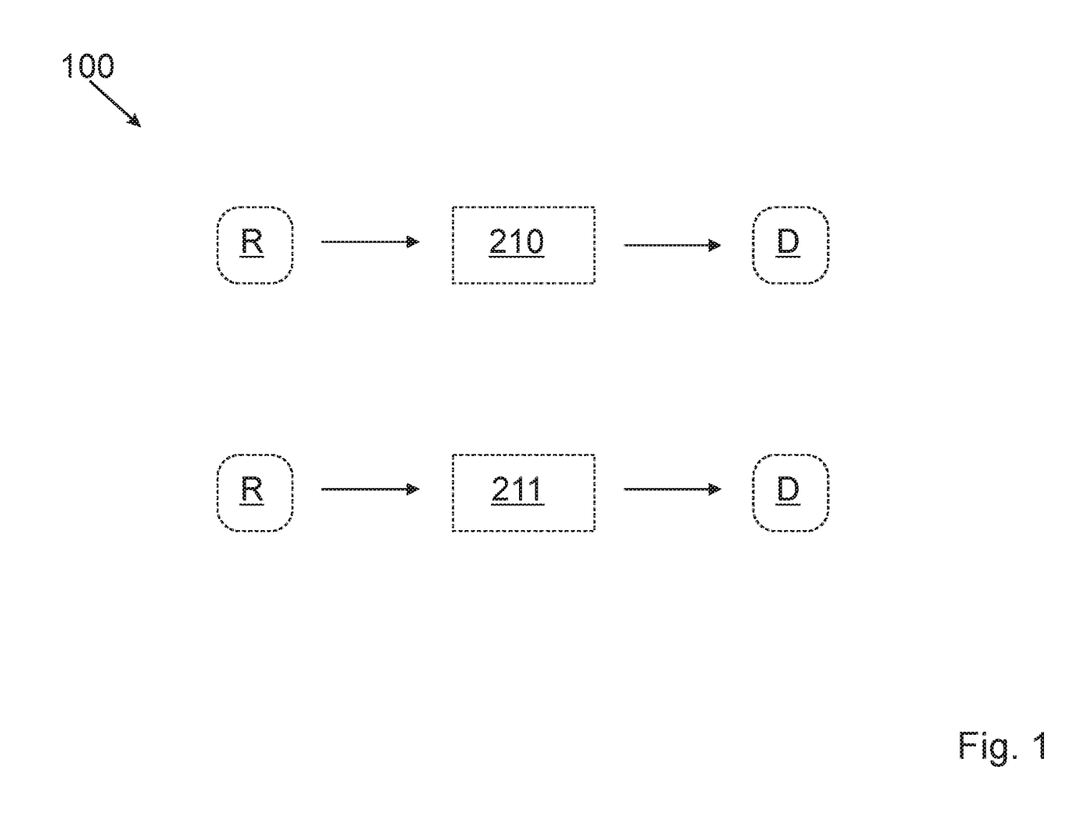
FIG. 1 representation for the visualization of a method according to the invention, FIG. 2 further illustration for the visualization of a method according to the invention, FIG. 3 further illustration for the visualization of a method according to the invention, FIG. 4 An illustration of a control system according to the invention, FIG. 5 further representation of a control system according to the invention for the visualization of a method according to the invention.

FIG. 1 schematically illustrates a method 100 according to the invention. Here it can be intended that a method execution 210 is performed according to a recipe information R. With this method version 210, a film is produced depending on the recipe information R. The produced film has at least one product property D, which determines the quality of the film. Conventionally, the produced film can only be tested in the laboratory after the (complete) method execution 210 or feedback from further processing or use of the film can be used to determine the product property D and thus obtain further information about the film quality. The inventive method 100 allows an improved control of the film production and/or film quality, whereby evaluations of the (expected) film quality and/or the product property D can be provided in particular also without an extensive laboratory examination. This can preferably be done during method execution 210 and/or shortly after method execution 210.

Figure 2:
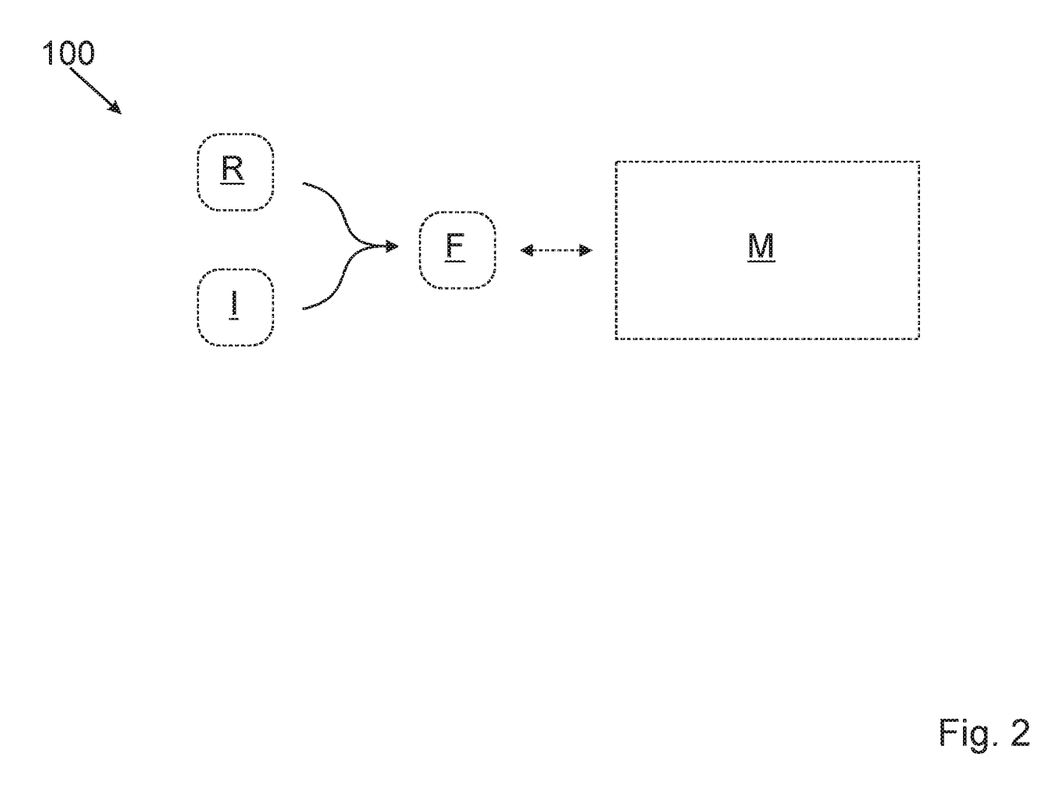

This advantage is achieved in particular by determining a fingerprint F for each method execution 210 and comparing it with a control matrix M. In other words, the control matrix M can be used as an evaluation basis to determine or predict the film quality on the basis of fingerprint F without costly examinations of the film, in particular already at the time of production of the film (i.e. during active method execution 210). As shown in FIG. 2, the fingerprint F is determined on the basis of monitoring information I and recipe information R of the corresponding method execution 210, so that this information can be used for the comparison with the control matrix M.

In order to further improve the control matrix M, it may be provided that it be adapted by previous method executions 210 and by the evaluation of associated fingerprints F and/or associated determined result information E. For this purpose, the fingerprints F and result information E can also be stored from a large number of previous method executions 210. This adapted control matrix M can then be used for a subsequent method execution 211. In order to enable evaluation, a large number of fingerprints F and/or result information E of previous method executions 210 in particular are stored and analyzed in a data system 200, in particular by determining a correlation and/or by trend analysis. To determine the result information E, laboratory tests, manual entries or the like can also be used. By the evaluation it is possible to recognize connections between the fingerprint F and the result information E.

Figure 3:
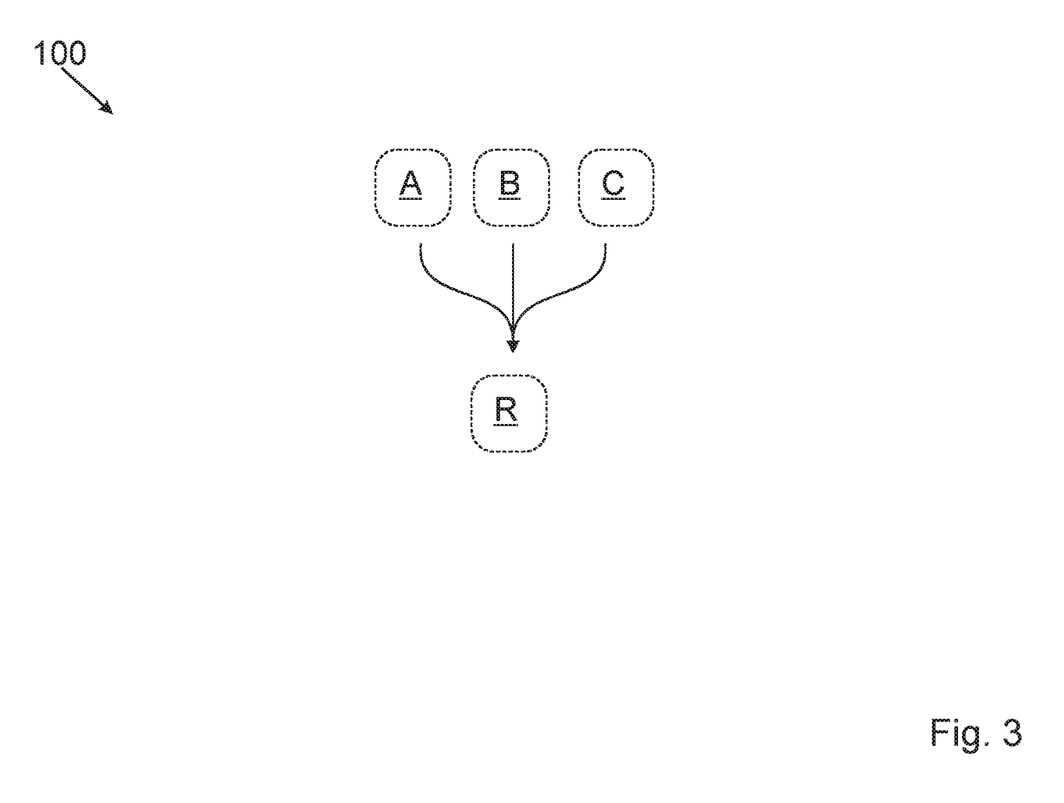

FIG. 3 shows that the recipe information R can contain information about various individual parameters, such as, for example, about at least one material mixture A and/or about at least one method parameter B and/or about at least one method parameter C. This information can at least partially be used to parameterize at least one film production machine to produce a film according to the recipe information R in a method execution 210.

Figure 4:
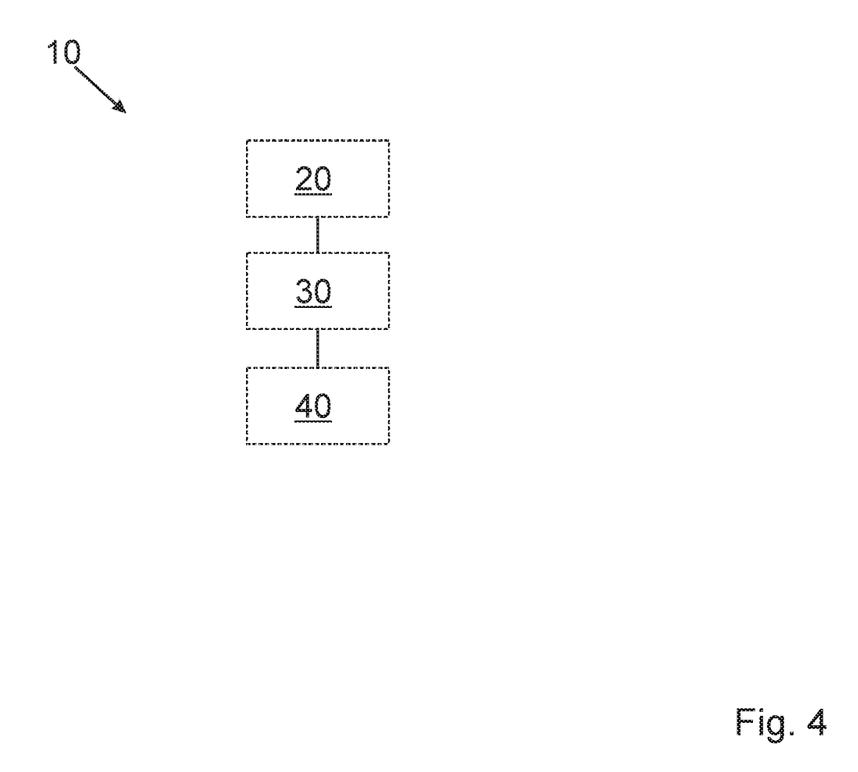

FIG. 4 schematically shows a control system 10. The control system 10 may have at least one monitoring device 20 for determining monitoring information I for a method execution 210 for film production. Furthermore, the control system 10 can have at least one processing device 30 for determining at least one fingerprint F on the basis of specific recipe information R for the method execution 210 and on the basis of the determined monitoring information I, so that the method execution 210 can be characterized on the basis of the fingerprint F.

Furthermore, an evaluation device 40 can be provided for the control system 10, which is electrically and/or via radio in data connection with the processing device 30 in order to provide a control matrix M for the processing device 30 and/or to adapt the control matrix M and/or to perform a comparison of the control matrix M with a fingerprint F.

Figure 5:
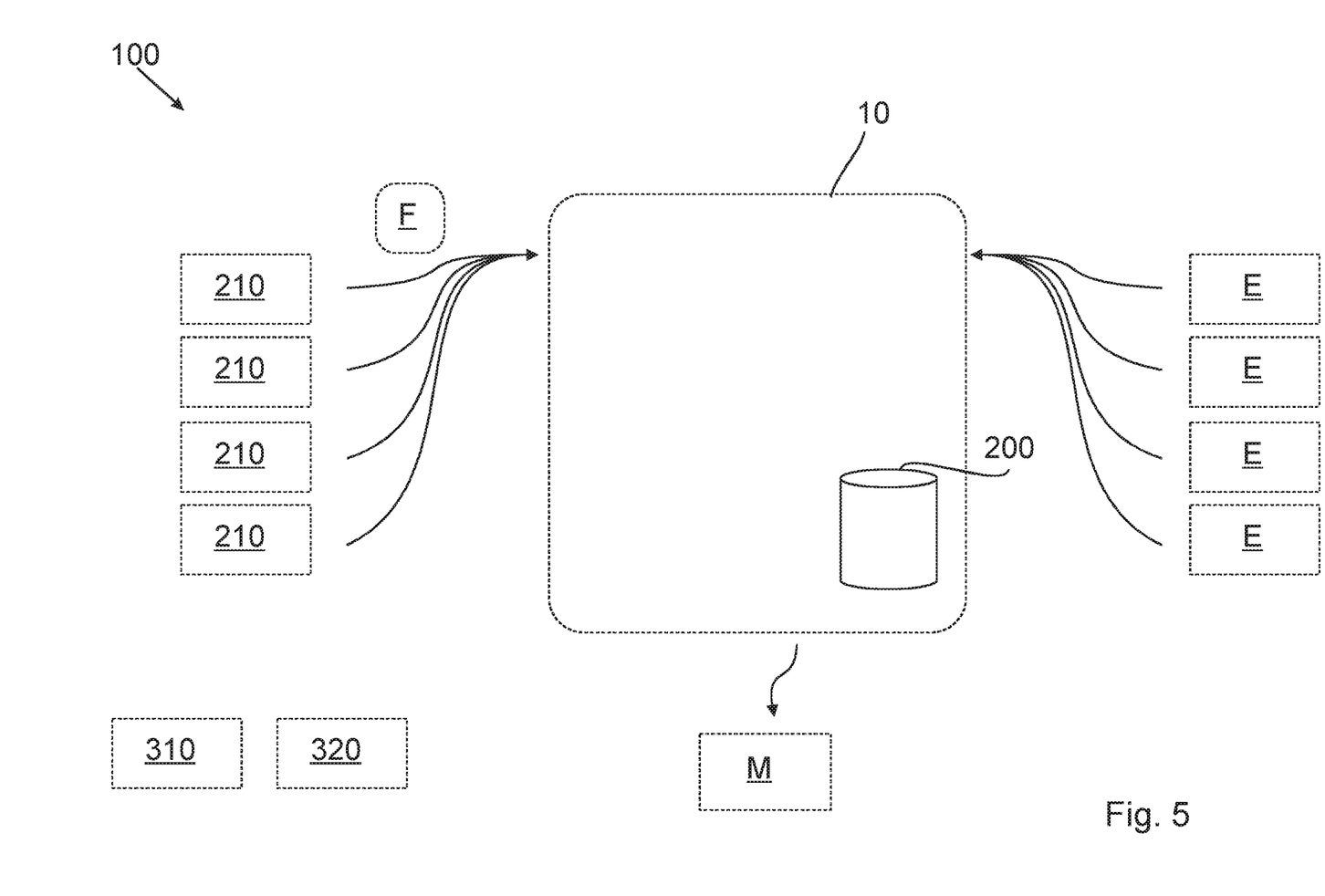

FIG. 5 visualizes a method 100 according to the invention with further details. It may be possible that a large amount of monitoring information I is determined for a large number of method versions 210. These can then be provided in each case with the recipe information R of the respective method version 210 as fingerprint F of this respective associated method version 210 in a data system 200 of the control system 10. The data system 200 comprises a provision unit 310, for example. The data system 200 is preferably configured as a database system, e.g. as a computer system with a database or as a software database system. Accordingly, the provisioning unit 310 may include an electronic component of the computer, such as a processor or data interface, or a software interface (such as SQL) or the like.

A single fingerprint F thus comprises at least the specific recipe information R for an associated method execution 210 and also the monitoring information I of the associated method execution 210 to characterize the associated method execution 210.

In addition, the result information E can be determined which, for example, includes information on product properties D of the manufactured films. These can then be used for an evaluation (in particular by an evaluation unit 320, such as a computer or processor of a computer) to determine a correlation with the fingerprints F. The fingerprints F can be used to determine the correlation between the fingerprints F and the computer. In order to enable the fingerprints F, which each belong to a specific method version 210 and characterize them, to be assigned to those result information E which are specific for the film produced in the corresponding respective method version 210, the result information E may, for example, comprise an identifier, coding and/or position information or the like, which thus refers to the associated fingerprint F. The evaluation can then be used, for example, to determine a control matrix M, i.e. in particular also to adapt an existing control matrix M.

Furthermore, it may be possible for the control system 10 to compare at least one monitoring information I or a plurality of monitoring information I for different individual parameters with a set value and/or with a tolerance range of the control matrix M. If the values of the monitoring information I for the respective individual parameters exceed and/or fall below the tolerance range or the set value, this may indicate, for example, that the quality of the film is insufficient. Depending on the comparison, for example, a warning can be issued. It is also conceivable that a quality indicator may be determined on the basis of this comparison in order to permanently identify the film quality of the film produced in this method version 210.

The preceding explanation of the embodiment describes the present invention exclusively in the context of examples. Of course, individual features of the embodiments can be freely combined with each other, if technically reasonable, without leaving the scope of the present invention.

10 Reference character list
10 Control system
20 Monitoring device
30 Processing apparatus
40 Evaluation device
100 Methods
200 Data system
210 Method execution
211 Subsequent method execution
310 Provisional unit
320 Evaluation unit
A Material mixing
B Method parameters
C Method variable
D Method property
E Result information
F Fingerprint
I Monitoring information
M Control matrix
R Recipe information

The invention claimed is:

1. A method for controlling film production, in which at least one film is produced depending on at least one recipe information,
where the following steps are performed:
initiating a method execution for film production so that a film is produced based on specific recipe information,
determination of monitoring information during method execution,
determining at least one fingerprint from the specific recipe information and from the monitoring information such that the method execution is characterized by the fingerprint,
comparison of the fingerprint with a control matrix, so that at least one comparison result for controlling film production is determined on the basis of the control matrix as the basis for evaluation,
wherein the following step is performed after comparing the fingerprint:
evaluating a quality of at least the method execution or the produced film based on the at least one comparison result, so that an evaluation result is determined, wherein the quality is correlated with a correspondence between at least one determined product property of the produced film and a given product property, whereby the control matrix is specific for the given product property and wherein a high quality corresponds to a high agreement between the determined product property and the given product property, wherein the following step is performed after evaluating the quality:

storing the evaluation result as a function of a roll identifier.

2. The method according to claim 1,
wherein
the control matrix comprises at least one comparison criteria for values of the fingerprint so that the method execution is controlled, preferably at least evaluated or adapted or visualized or managed or regulated as a function of the comparison criteria using the comparison result.

3. The method according to claim 1,
wherein
the control matrix comprises a tolerance range as a comparison criterion, and the comparison result is determined directly or indirectly by determining relationship information, preferably at least distance information or variation information or information about at least an overshoot or undershoot of at least one value from the fingerprint to at least one limit.

4. The method according to claim 1,
wherein
at least one of the following steps is performed after evaluating the quality:
at least automatic evaluation or adjustment of the recipe information on the basis of the evaluation result,
automatic adjustment of a tolerance range of the control matrix based on the evaluation result.

5. The method according to claim 1,
wherein
at least one of the following steps is performed after comparing the fingerprint:
at least initiating an alarm or a warning when the at least one comparison result fulfils an alarm or warning condition, preferably when a relationship information indicates a crossing of a border,
performing a plausibility check from the at least one comparison result, wherein a warning is initiated if the plausibility check is negative.

6. The method according to claim 1,
wherein
the following step is performed after comparing the fingerprint:
performing an active control of the method execution depending on the at least one comparison result in order to improve the quality of the film produced, preferably by control of a film production machine, the control preferably being performed at least partially automatically.

7. The method according to claim 1,
wherein
at least one measurement is performed during the method execution in order to determine the monitoring information, the measurement preferably being performed for at least one method parameter or at least one method variable during the method execution.

8. The method according to claim 1,
wherein
the recipe information for different individual parameters of the method execution in each case comprises at least one piece of information, in particular:

at least information for material mixing during method execution,
at least one information for at least one method parameter of the method execution,
at least one information for a method variable of the method execution.

9. The method according to claim 8,
wherein
the following steps are performed one after the other at least during or after comparing the fingerprint:
determining comparison results for a plurality of the individual parameters, in particular by comparing the values of the monitoring information specific to the respective individual parameters with at least one respective comparison criterion of the control matrix,
determining an individual quality score for each of the comparison results so that the individual quality score is specific to a particular individual parameter,
determining a single quality index from the individual quality indexes to identify at least a quality of the method execution or the film produced, preferably prioritizing the individual quality indexes to determine.

10. The method according to claim 1,
wherein
before the method execution is initiated, the control matrix is determined taking into account at least a multiplicity of preceding method executions or comparison results.

11. The method according to claim 1,
wherein
the control matrix is adapted to the film produced by the method execution on the basis of at least the comparison result or at least one product property, so that the control matrix is optimized for a predetermined product property.

12. The method according to claim 1,
wherein
the following steps for determining the control matrix are performed before initiating the method execution as a subsequent method execution:
determining a correlation for preceding method executions with respect to the product properties of the films produced thereby, preferably on the basis of at least one particular fingerprint for each of the preceding method executions, so that a correlation result is determined,
at least determining or adjusting a tolerance range of the control matrix on the basis of the correlation result in order to at least adjust the subsequent method execution or further subsequent method executions on the basis of the control matrix taking into account the correlation.

13. The method according to claim 1,
wherein
the following steps are performed during the method execution or during each further method execution:
at least evaluating a correlation for the method execution or the further method executions between at least one product property of the at least one film produced thereby and the fingerprint determined thereby in each case, so that a correlation result is determined, adjusting the control matrix on the basis of the correlation result so that the control matrix is specific for at least one predetermined product property.

14. The method according to claim 12, wherein
the correlation is evaluated across all recipes for different method executions by means of which in each case a film is produced using different recipe information.

* * * * *